United States Patent
Injac

(10) Patent No.: US 11,319,835 B2
(45) Date of Patent: May 3, 2022

(54) TURBOCHARGER FOR AN INTERNAL COMBUSTION ENGINE WITH A HYDRODYNAMIC FLOATING BEARING

(71) Applicant: BorgWarner Inc., Auburn Hills, MI (US)

(72) Inventor: Ivan Injac, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 145 days.

(21) Appl. No.: 16/954,314

(22) PCT Filed: Dec. 21, 2018

(86) PCT No.: PCT/US2018/067028
§ 371 (c)(1),
(2) Date: Jun. 16, 2020

(87) PCT Pub. No.: WO2019/126615
PCT Pub. Date: Jun. 27, 2019

(65) Prior Publication Data
US 2021/0115813 A1  Apr. 22, 2021

(30) Foreign Application Priority Data
Dec. 22, 2017  (DE) .......................... 102017223765.1

(51) Int. Cl.
*F01D 25/16* (2006.01)
*F02B 37/02* (2006.01)
(Continued)

(52) U.S. Cl.
CPC .......... *F01D 25/166* (2013.01); *F02B 37/025* (2013.01); *F01D 25/18* (2013.01);
(Continued)

(58) Field of Classification Search
CPC ...... F01D 25/166; F01D 25/18; F02B 37/025; F02B 39/14; F05D 2220/40;
(Continued)

(56) References Cited

U.S. PATENT DOCUMENTS 9,726,189 B2 * 8/2017 Nishida ................. F01D 25/186
10,393,169 B2 * 8/2019 Kleinschmidt ....... F01D 25/166
(Continued)

FOREIGN PATENT DOCUMENTS

DE    10 2014 116992 A1    5/2016
EP     3 258 123 A1        12/2017
(Continued)

OTHER PUBLICATIONS

International Search Report of the International Searching Authority for PCT/US2018/067028 dated Mar. 6, 2019.

*Primary Examiner* — Jesse S Bogue
(74) *Attorney, Agent, or Firm* — Howard & Howard Attorneys PLLC

(57) ABSTRACT

The invention relates to a turbocharger for an internal combustion engine, comprising a housing (1) with an exhaust-gas-side and an air-side turbine blade (2), a shaft (3) connecting the turbine blades, and at least one radially acting rotary bearing for mounting the shaft (3), wherein the rotary bearing is designed as a hydrodynamic floating bearing, wherein a lubricant flows in a completely surrounding bearing gap (8) of the rotary bearing in the direction of rotation and has a local lubricant pressure, the bearing gap (8) has a contouring (10, 11, 10a, 11a, 12, 13, 14, 15) due to which the at least two local maxima (PM1, PM2) of the lubricant pressure are formed at two defined angular positions (W1, W2) in the direction of rotation.

17 Claims, 4 Drawing Sheets

(51) Int. Cl.
  *F01D 25/18* (2006.01)
  *F16C 17/10* (2006.01)
  *F16C 33/10* (2006.01)

(52) U.S. Cl.
  CPC ...... *F05D 2220/40* (2013.01); *F05D 2240/53* (2013.01); *F16C 17/10* (2013.01); *F16C 33/107* (2013.01); *F16C 2360/24* (2013.01)

(58) Field of Classification Search
  CPC .. F05D 2240/53; F16C 17/10; F16C 2360/24; F16C 33/1065; F16C 33/107; Y02T 10/12
  See application file for complete search history.

(56) References Cited

U.S. PATENT DOCUMENTS

| | | | |
|---|---|---|---|
| 11,187,236 B2* | 11/2021 | Jaenike | F04D 29/056 |
| 2011/0075957 A1* | 3/2011 | Gutknecht | F01D 25/166 |
| | | | 384/286 |
| 2017/0107896 A1 | 4/2017 | Gugau et al. | |
| 2018/0258984 A1* | 9/2018 | Futae | F16C 17/18 |

FOREIGN PATENT DOCUMENTS

| | | |
|---|---|---|
| JP | H01 193409 A | 8/1989 |
| JP | H05 71358 A | 3/1993 |
| WO | 2010/135135 A1 | 11/2010 |

\* cited by examiner

TURBOCHARGER FOR AN INTERNAL COMBUSTION ENGINE WITH A HYDRODYNAMIC FLOATING BEARING

CROSS-REFERENCE TO RELATED APPLICATIONS

The present application is the National Stage of International Patent Application No. PCT/US2018/067028 filed on Dec. 21, 2018, which claims priority to and all the benefits of German Patent Application No. 102017223765.1 filed Dec. 22, 2017, which are hereby incorporated by reference in their entirety.

The invention relates to a turbocharger for an internal combustion engine according to the preamble of Claim 1.

US 2017/0107896 A1 describes an exhaust gas turbocharger in the design of a multi scroll turbocharger. In such a design, the exhaust gas flows from two different groups of pistons pass through two different channels and meet in two different areas of an exhaust-gas side turbine blade.

It is the object of the invention to design a turbocharger in which a radial mounting is stabilized by a shaft.

This problem is solved for a turbocharger according to the invention of the type listed at the outset with the characterizing features of Claim 1.

Due to the contouring to form at least two local maxima of lubricant pressure, it is achieved that radial forces acting on the shaft are intercepted by the areas of particularly high lubricant pressure. The risk of a contact of the shaft with a bearing wall and/or an interruption of the hydrodynamic lubrication state is hereby reduced. In particular, the defined angular positions of the maxima of the lubricant pressure allow the mounting of the shaft to be optimized with respect to external influences, for example, radial forces in certain directions.

An exclusively radially acting bearing is preferably understood as a radially acting rotary bearing. However, a combined bearing, which acts both radially and also axially, is also fundamentally included in the invention.

In general, all radially acting bearings of the shaft of the turbocharger may be designed according to the invention. It is particularly preferred if at least one rotary bearing arranged in the area of the exhaust-gas-side turbine is designed according to the invention.

The lubricant is generally preferred to be a lubricant oil, preferably the lubricant oil of an oil circuit of the internal combustion engine.

A bearing, in which a distribution of the local lubricant pressure is initially dynamically generated by the rotational movement of the shaft, is understood in particular to be a hydrodynamic floating bearing. In this type of normal operation, at least, no contact occurs between the shaft and the bearing wall, such that a completely surrounding bearing gap is provided.

In a generally advantageous refinement of the invention, the angular positions of the maxima have a minimal angular spacing from one another of between 140° and 180°, in particular between 160° and 180°. By this means, the pressure maxima lie substantially on opposite sides of the bearing gap and may support forces that oppose one another.

In one generally advantageous embodiment of the invention, the turbocharger is designed as a multi-scroll turbocharger, particularly preferably as a dual volute turbocharger, wherein the at least two local maxima of the lubricant pressure have a respective relative angular position to at least two differently positioned inlet areas of the exhaust-gas-side turbine blades. In designs of turbochargers of this type, an alternating exhaust gas flow occurs due to this principle, said gas flow also being temporally offset in the different inlet regions due to the assignment to other cylinders. This results in radial forces acting radially inwardly on the shaft, which occur temporally alternating in different, yet defined, directions. In multi-scroll turbochargers, these radial forces are most often offset to be approximately opposite or by approximately 180°. However, depending on the precise housing shape and/or other force components, e.g. gravity, the orientation of the radial forces may also deviate somewhat. The mounting of a turbocharger according to the invention is suited for supporting such forces in a particularly advantageous way. The angular positions of the pressure maxima may thereby be structurally adapted to the angular positions of the radial forces due to the corresponding contouring.

It is therefore particularly preferred if precisely two local pressure maxima are provided.

In one preferred embodiment of the invention, the bearing gap is supplied with the lubricant via at least two feed holes. It is thereby particularly preferred to provide an oil distribution groove, preferably formed according to a type of moon groove, which extends across a defined angle in the direction of rotation in the area of each of the feed holes. Due to such a feed hole, the bearing gap is locally enlarged at least along a partial axial extension, such that a local sink is created for the hydrodynamic lubricant pressure. Due to the two feed holes, two sinks are thus created, such that at least two local pressure maxima are formed between the sinks. The position of the feed holes correspondingly influences the angular position of the local maxima. As a whole, the feed holes thus define a contouring of the bearing gap to form the local pressure maxima in the meaning of the invention.

The oil distribution grooves are preferably designed in a known way as moon grooves. These are thereby recesses with the cross-sectional shape of a crescent moon, which extend across the actual feed hole. The oil distribution grooves preferably terminate in a shallow angle in the broader bearing gap and thus ensure an optimal lubricant supply in a known way. Due to their precise shape and their angle of extension in the direction of rotation, the oil distribution grooves may influence the position of the local pressure maxima, such that the oil distribution grooves are part of the contouring of the bearing gap.

In one preferred detailed configuration, it is thereby provided that the angular positions of the local maxima of the lubricant pressure each have an angular spacing of at least 15°, in particular at least 30°, from a center of the feed hole closest in the direction of rotation.

In another embodiment of the invention, it is provided that the contouring of the bearing gap comprises at least one local minimum, preferably at least two local minima, of a radial height. Starting from the local minimum, the radial height of the bearing gap preferably increases monotonically counter to the direction of rotation. In particular, the bearing may thereby be designed according to a type of offset bearing.

Offset bearings are hydrodynamic rotary bearings, in which two semi-cylindrical halves of a bearing shell are displaced in the radial direction against one another in the junction plane. In particular, two opposite lubricant supplies of the bearing gap may thereby lie in the junction plane.

The radial height of the bearing gap is thereby understood to be the radial distance present from an axis of rotation of the shaft to a wall of the bearing in a specific angular position. The axis of rotation of the shaft is thereby considered to be the unchanging, average or ideal axis of rotation in undisturbed normal operation.

In another possible embodiment of the invention, the radial height of the bearing gap has at least one, preferably two stepped changes. The bearing gap thereby preferably runs in the direction of rotation, starting from a lubricant hole, initially across the region of greater radial height and after the step in the region of smaller radial height. Due to the stepped change of the radial height, a local pressure increase is thereby achieved so that the angular position of a local pressure maximum is approximately correlated to the step.

The rotary bearing may generally advantageously be designed as a fully floating bearing, wherein a bearing bush is float mounted with respect to the shaft on one side and with respect to the housing on the other side. In the interests of a simple technical implementation, the contouring is thereby defined on the housing and the local maxima of the lubricant pressure occurs between the bearing bush and the housing. The bearing gap is thereby an outer bearing gap, wherein another inner bearing gap runs between the shaft and the bearing bush. The bearing bush may have one or more lubricant holes in order to also supply the inner bearing gap between the bearing bush and the shaft, starting from the outer bearing gap.

In another possible embodiment, it is provided that the bearing is designed as a semi-floating bearing, wherein a bearing bush is arranged rotationally fixed on the housing and the contouring is defined on the bearing bush. The bearing gap with the local pressure maxima hereby runs directly between the shaft and the bearing bush.

Further advantages are derived from the subsequent description of exemplary embodiments with reference to the drawing and from the dependent claims.

Six preferred embodiments of the invention are subsequently described and explained in greater detail by way of the appended drawings.

Figure 1:
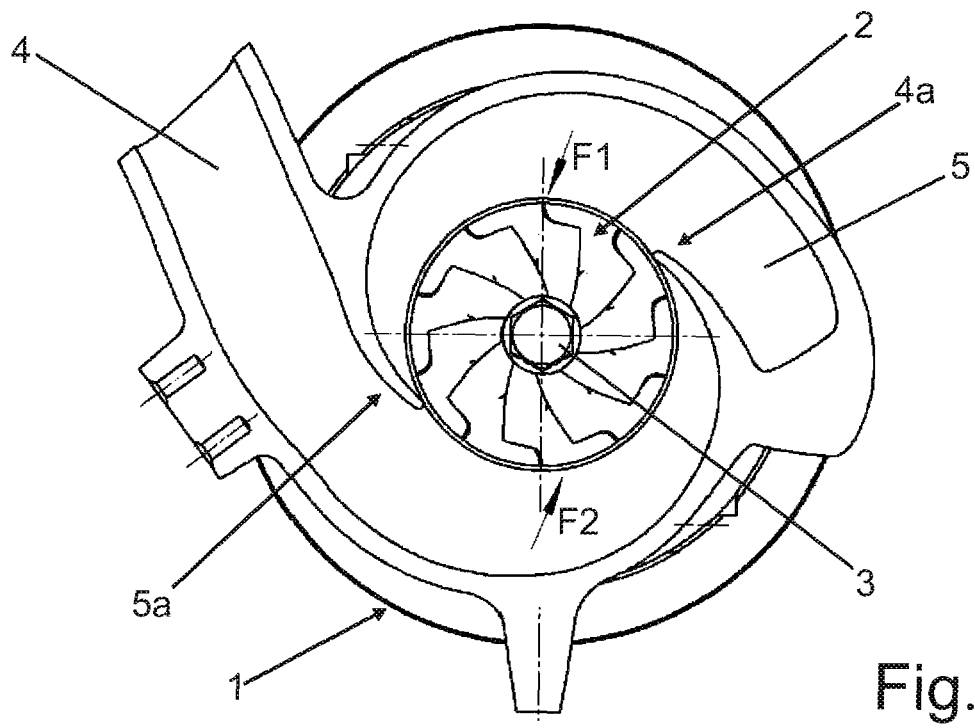
FIG. 1 shows a schematic sectional view of a multi-scroll turbocharger according to the invention in a sectional plane perpendicular to an axis of rotation.

The turbocharger shown in FIG. 1 comprises a housing 1, an exhaust-gas-side turbine blade 2, and a central shaft 3. Shaft 3 connects exhaust-gas-side turbine blade 2 to an air-side turbine blade (not shown).

The turbocharger is designed as a multi-scroll turbocharger, presently as a dual volute turbocharger. This means that the exhaust gas flow of an internal combustion engine (not shown) is guided in two separate channels 4, 5 of housing 1. First channel 4 and second channel 5 thereby end in regions B1, B2 positioned differently with respect to a circumferential direction. The ends of the channels are thereby each formed by tongues 4a, 5a extending close to turbine blade 2.

Thus, the exhaust gas flows of the two channels also meet turbine blade 2 in different regions B1, B2. This leads to two resulting force vectors F1, F2 which the exhaust gas flows respectively exert on turbine blade 2.

As these force vectors F1, F2 also have components directed radially inward, a radial force is thus exerted in the direction of shaft 3 by the exhaust gas flows in each case. The positions of the force vectors lie approximately 180° opposite each other. However, in the best case, the forces compensate in a temporal average. In fact, channels 4, 5 are assigned to different groups of cylinders of the internal combustion engine, so that at a specific point in time, at most one force acting radially on shaft 3 is respectively present due to the exhaust gas flow. This total radial force on shaft 3 changes, oscillating in amount and direction.

Figure 2:
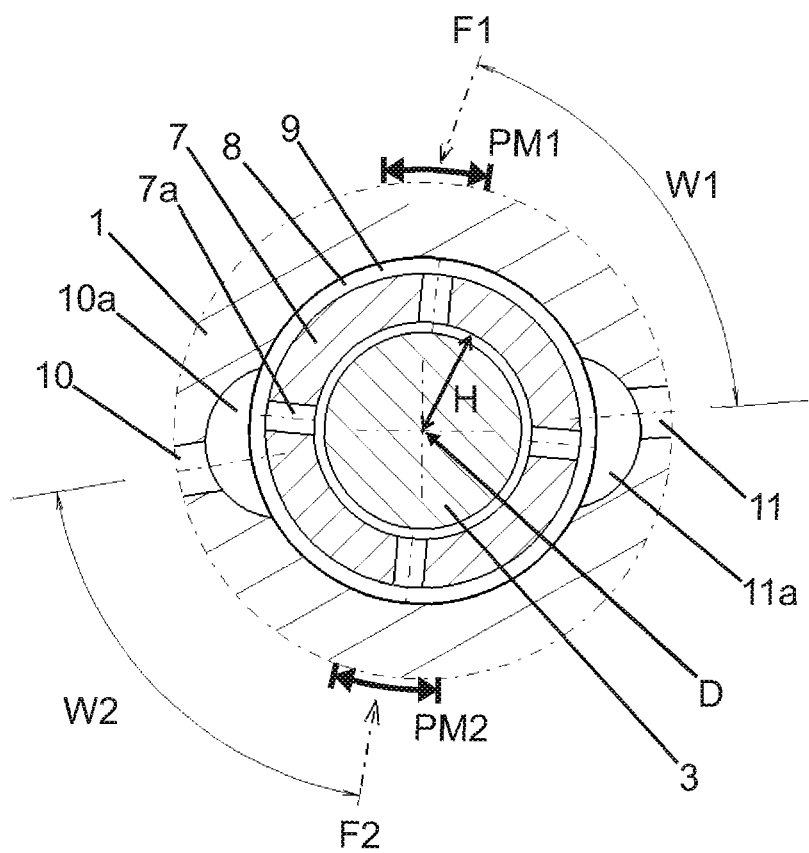
FIG. 2 shows a schematic partial sectional view of the turbocharger from FIG. 1 in an area of a radial rotary bearing.

FIG. 2 shows a radially-acting rotary bearing 6 designed according to the invention. This is a hydrodynamic floating bearing in which a pressure of a lubricant is generated dynamically during operation due to the rotation. In this operating state at sufficient rotational speed, a complete or contact-less floating of the participating bearing surfaces on a lubricant film is then present.

Bearing 6 is designed as a fully floating bearing. This means that a co-rotating bearing bush 7 is arranged between shaft 3 and housing 1. An outer bearing gap 8 is thereby designed between housing 1 and bearing bush 7. In addition, an inner bearing gap 9 is designed between bearing bush 7 and shaft 3.

The lubricant, presently oil of the lubricant circuit of the internal combustion engine, is guided via channels in housing 1 through a first feed hole 10 and a second feed hole 11 into first outer bearing gap 8. The oil may flow from outer bearing gap 8 to inner bearing gap 9 via through holes 7a in bearing bush 7.

Figure 3:
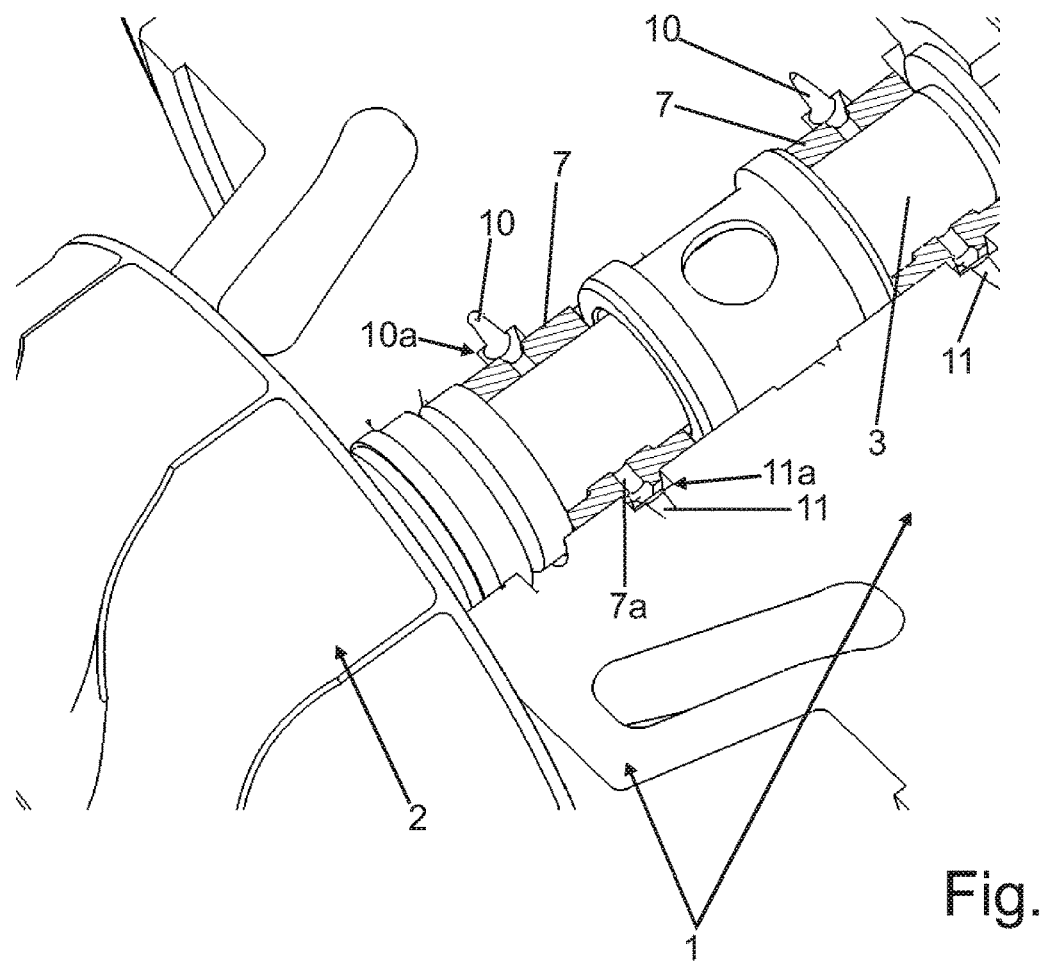
FIG. 3 shows a spatially partially cutaway view of the turbocharger from FIG. 1.

The feed holes in housing 1 respectively open into crescent moon shaped recesses or oil distribution grooves (moon grooves) 10a, 11a. These oil distribution grooves 10a, 11a extend in the axial direction not only across a part of an axial length of the bearing gap or an axial length of bearing bush 7. This is clear from the spatial depiction in FIG. 3. The oil distribution grooves likewise extend in the circumferential direction across a small opening angle in a range from 10°-60°.

Feed holes 10, 11 with oil distribution grooves 10a, 11a are offset by 180° or are positioned diametrically opposite in the circumferential direction with respect to a central axis of rotation D of shaft 3.

Due to feed holes 10, 11 and oil distribution grooves 10a, 11a, the bearing gap is locally enlarged, such that a local sink is created for the hydrodynamic lubricant pressure. Due to feed holes 10, 11, two pressure sinks are thus created, such that at least two local pressure maxima PM1, PM2 of the lubricant pressure are formed in outer bearing gap 8 between the sinks. The angular range of pressure maxima PM1, PM2 in bearing gap 8 is roughly indicated in FIG. 4 by angular arrows PM1, PM2.

The angular positions of feed holes 10, 11 selected during the design of the housing, correspondingly affects the angular positions of local maxima PM1, PM2. As a whole, feed holes 10, 11 and oil distribution grooves 10a, 11a thus define a contouring of bearing gap 8 for the formation of local pressure maxima PM1, PM2 in connection with acting forces F1, F2.

Presently, pressure maxima PM1, PM2 respectively coincide with positions F1, F2 of the radial force effects of the exhaust gas flow. Thus, these forces are optimally intercepted by the local maximal lubricant pressures.

An angular spacing of the two pressure maxima from one another is presently around 180°.

A respectively smallest angular spacing W1, W2 of the pressure maxima from one of the feed holes, measured up to the center of the feed hole, is presently respectively approximately 70°. These minimum angles or minimal spacings W1, W2 should be sufficiently large enough to facilitate a sufficiently high local maximal pressure as a whole.

It is understood that the measures of the contouring according to the invention have an influence on a relative pressure distribution of the lubricant. Absolute values of the pressure and the pressure maxima are also determined by corresponding additional parameters, like the width of bearing gap 8, the size of a supply pressure of the lubricant, the dimension and shape of oil distribution grooves 10a 11a, the rotational speed of shaft 3, etc.

Figure 4:
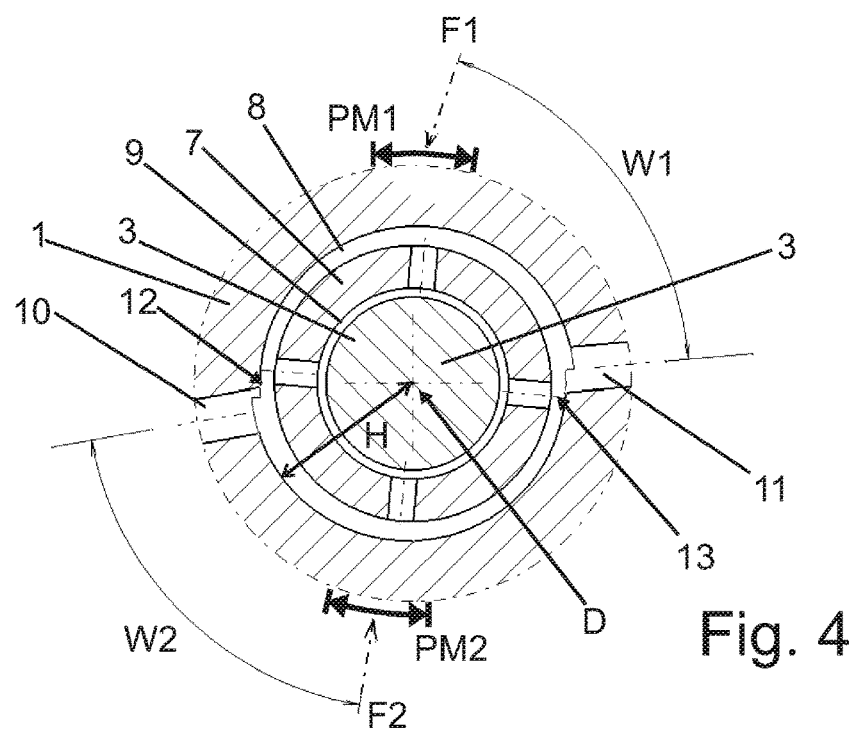
FIG. 4 shows a schematic partial sectional view of a second embodiment of a turbocharger according to the invention.
Figure 5:
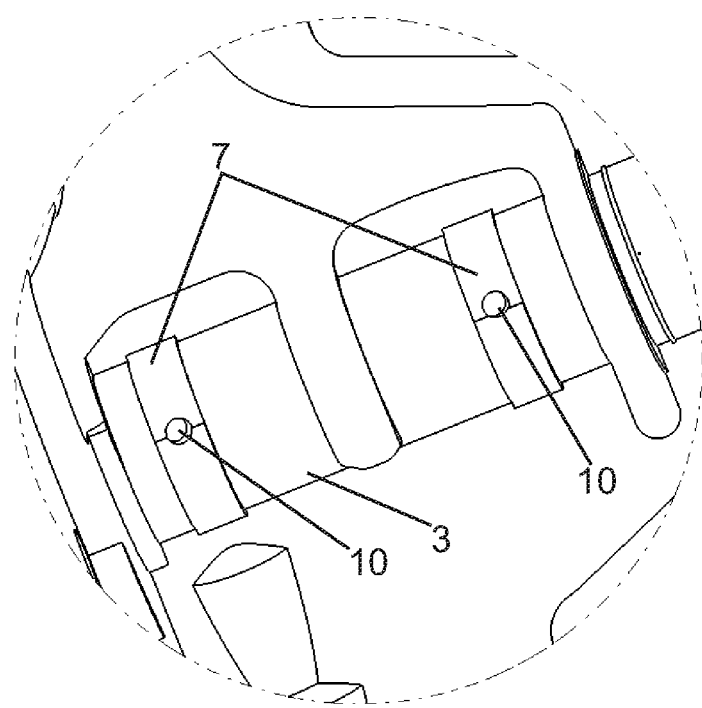
FIG. 5 shows a spatially partially cutaway view of the turbocharger from FIG. 4.

Another embodiment of the invention is shown in FIG. 4 and FIG. 5.

As in the first embodiment, two feed holes 10, 11 are provided in housing 1 arranged in defined positions.

In contrast to the first embodiment, the bearing is designed as an offset bearing. Offset bearings are hydrodynamic rotary bearings, in which two semi-cylindrical halves of a bearing shell are displaced in the radial direction against one another in the junction plane. As a whole, the outer wall of outer bearing gap 8 is thus no longer formed as cylindrical, but instead by two half cylinders pressed against one another.

In such a contouring of the bearing gap, at least two local minima 12, 13 of a radial height H of bearing gap 8 are present. The radial height of bearing gap 8 is thereby understood to be the radial distance present from axis of rotation D of shaft 3 to a wall of the bearing in a specific angular position. Axis of rotation D of shaft 3 is thereby considered to be the unchanging, average or ideal axis of rotation in undisturbed normal operation.

Presently (FIG. 4), the direction of rotation of shaft 3 is counter clockwise. Starting from local minimum 12, 13, radial height H of bearing gap 8 preferably increases monotonically counter to the direction of rotation. A first and a second area of a continuous change of the radial height are thus correspondingly present.

Oil distribution grooves are not shown in the drawings in the second embodiment. Depending on the demands, such oil distribution grooves may be provided analogously to the first example.

The areas of local pressure maxima PM1, PM2 are hydrodynamic as in the first embodiment and should be aligned with radial forces F1, F2. Due to the design as an offset bearing, a contouring according to the invention and an additional parameter are provided for optimizing the relative and absolute pressure profile. A defined alignment of feed holes 10, 11 relative to the positions of outer forces F1, F2 is thereby essential, as in the first embodiment, to improve the stability of the bearing.

Figure 6:
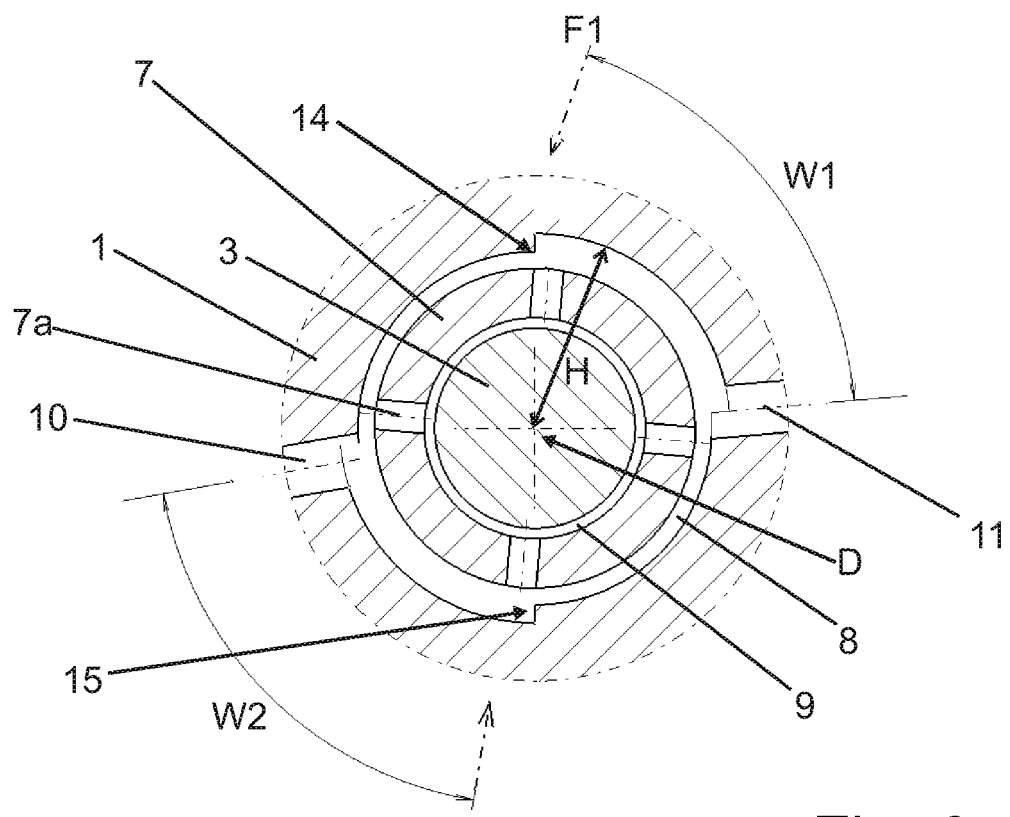
FIG. 6 shows a schematic partial sectional view of a third embodiment of a turbocharger according to the invention.

In the third embodiment of the invention shown in FIG. 6, two local changes 14, 15 of radial height H of bearing gap 8 are additionally provided in contrast to the example according to FIG. 4. The changes are thereby present in the form of steps. The direction of rotation of the shaft is again counter clockwise (FIG. 6). Accordingly, the lubricant, starting from a feed hole 10, 11, initially passes through a section of greater radial height H up to step 12, 13. Subsequently, the lubricant passes through a section of smaller radial height H up to the next feed hole 10, 11.

Local pressure maxima PM1, PM2 are found in the area of steps 14, 15 or the local changes in the radial height. It thereby applies that steps 12, 13 should have a minimum spacing from feed holes 10, 11.

Figure 7:
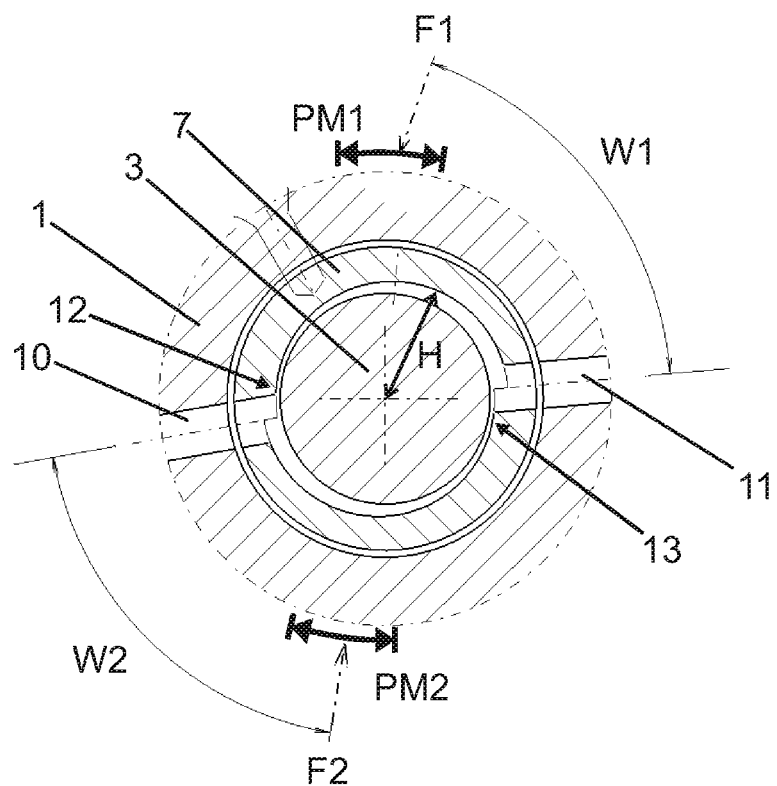
FIG. 7 shows a schematic partial sectional view of a fourth embodiment of a turbocharger according to the invention.

FIG. 7 shows a fourth embodiment of the invention. In this example, the rotary bearing is not designed as a fully floating bearing, like in the preceding examples, but as a semi-floating bearing. In such an embodiment, it is provided that bearing bush 7 is arranged rotationally fixed in a defined orientation on housing 1. The contouring for producing the local pressure maxima is thereby designed on bearing bush 7. In this case, bearing gap 8 with local pressure maxima PM1, PM2 runs directly between shaft 3 and bearing bush 7. A second, inner bearing gap, like in the case of a fully floating bearing, is not present.

The rotary bearing shown in FIG. 7 corresponds, apart from this difference, to the example from FIG. 4 (offset bearing). Therefore, reference is made to this example with regard to the additional features.

Figure 8:
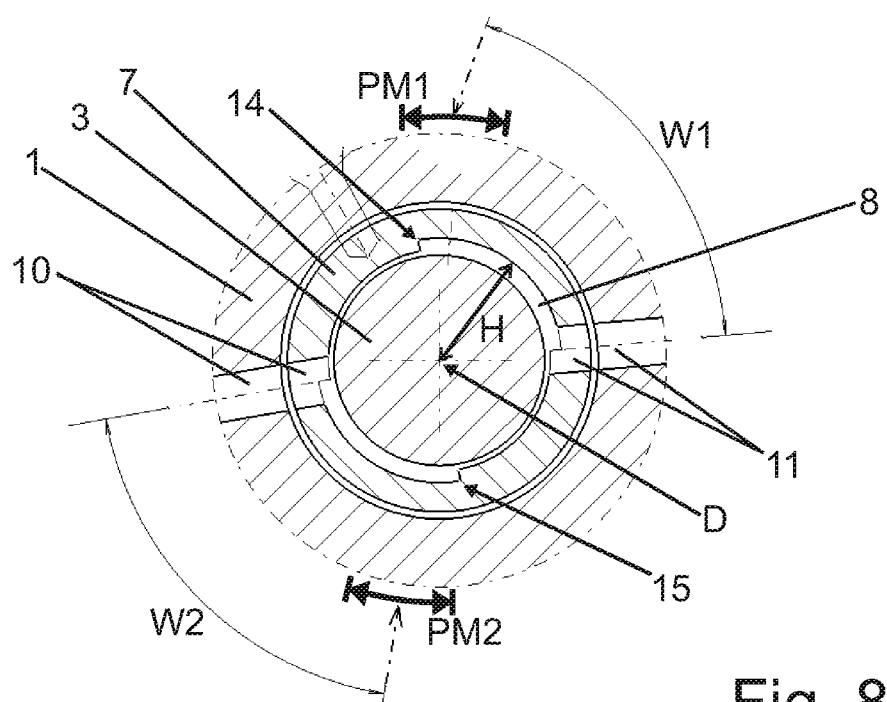
FIG. 8 shows a schematic partial sectional view of a fifth embodiment of a turbocharger according to the invention.

FIG. 8 shows a fifth embodiment of the invention. As in the previous example, this design is a semi-floating bearing. With respect to the contouring of the bearing gap, the bearing corresponds to that of the embodiment according to FIG. 6 with two local steps 14, 15 or changes of the radial height H.

Another sixth embodiment is not depicted in the figures. This is the case of the design of a semi-floating bearing, otherwise with the contouring of bearing gap 8 according to the first embodiment according to FIG. 2. In this case, oil distribution grooves 10a, 11a or moon grooves are correspondingly designed in bearing bush 7 and not in housing 1.

All of the different, exemplary contourings of bearing gap 8 may be realized in the design of a fully floating bearing or in the design of a semi-floating bearing.

REFERENCE NUMERALS

1 Housing
2 Exhaust-gas-side turbine blade
3 Shaft
4 First exhaust gas channel
4a Tongue of the first exhaust gas channel
5 Second exhaust gas channel
5a Tongue of the second exhaust gas channel
6 Rotary bearing
7 Bearing bush
7a Through holes
8 Outer bearing gap
9 Inner bearing gap
10 First feed hole
10a First oil distribution groove/moon groove
11 Second feed hole
11a Second oil distribution groove/moon groove
12 First local minimum of the radial height
13 Second local minimum of the radial height
14 First local step of the radial height
15 Second local step of the radial height
B1 End region of the first exhaust gas channel
B2 End region of the second exhaust gas channel
D Axis of rotation of the shaft
F1 Force effect of the exhaust gas flow from the first exhaust gas channel
F2 Force effect of the exhaust gas flow from the second exhaust gas channel
H Radial height of the bearing gap W1 Minimum angular spacing of the first pressure maximum to the feed hole
W2 Minimum angular spacing of the second pressure maximum to the feed hole
PM1 First local pressure maximum
PM2 Second local pressure maximum

The invention claimed is:

1. A turbocharger for an internal combustion engine comprising
   a housing (1) with an exhaust-gas-side turbine blade (2) and an air-side turbine blade,
   a shaft (3) connecting the turbine blades, and
   at least one radially acting rotary bearing for mounting the shaft (3),
   wherein the rotary bearing is designed as a hydrodynamic floating bearing,
   wherein a lubricant flows in a completely surrounding bearing gap (8) of the rotary bearing in the direction of rotation and has a local lubricant pressure,
   characterized in that
   the bearing gap (8) has a contouring (10, 11, 10a, 11a, 12, 13, 14, 15) due to which at least two local maxima (PM1, PM2) of the lubricant pressure are formed at two defined angular positions (W1, W2) in the direction of rotation, and
   the turbocharger is designed as a multi-scroll turbocharger, wherein the at least two local maxima (PM1, PM2) of the lubricant pressure have a respective relative angular position to at least two differently positioned inlet areas (4, 4a, 5, 5a) of the exhaust-gas-side turbine blade (2).

2. The device according to claim 1, characterized in that the angular positions of the maxima (PM1, PM2) have a minimal angular spacing from one another of between 140° and 180°.

3. The device according to claim 1, characterized in that the bearing gap (8) is supplied with the lubricant via at least two feed holes (10, 11).

4. The device according to claim 3, characterized in that an oil distribution groove (10a, 11a) is provided in the area of each of the feed holes (10, 11) and extends across a defined angle in the direction of rotation.

5. The device according to claim 3, characterized in that the angular positions of the local maxima of the lubricant pressure each have an angular spacing (W1, W2) of at least 15° from a center of the feed hole (10, 11) closest in the direction of rotation.

6. The device according to claim 1, characterized in that the contouring (10, 11, 10a, 11a, 12, 13, 14, 15) of the bearing gap (8) comprises at least two local minima (12, 13, 14, 15) of a radial height (H).

7. The device according to claim 6, characterized in that the radial height (H) of the bearing gap (8) increases monotonically counter to the direction of rotation, starting from the local minimum (12, 13).

8. The device according to claim 6, characterized in that the bearing is designed as a type of offset bearing.

9. The device according to claim 6, characterized in that the radial height (H) of the bearing gap (8) has at least two stepped changes (14, 15).

10. The device according to claim 1, characterized in that the rotary bearing is designed as a fully floating bearing, wherein a bearing bush (7) is float mounted on the one side with respect to the shaft (3) and on the other side with respect to the housing (1).

11. The device according to claim 10, characterized in that the contouring (10, 11, 10a, 11a, 12, 13, 14, 15) is designed on the housing (1) and the local maxima (PM1, PM2) of the lubricant pressure occur between the bearing bush (7) and the housing (1).

12. The device according to claim 1, characterized in that the rotary bearing is designed as a semi-floating bearing, wherein the bearing bush (7) is arranged rotationally fixed on the housing (1) and the contouring (10, 11, 10a, 11a, 12, 13, 14, 15) of the bearing gap (8) is designed on the bearing bush (7).

13. The device according to claim 1, characterized in that the at least two local maxima (PM1, PM2) are precisely two local maxima (PM1, PM2).

14. The device according to claim 1, wherein the turbocharger is designed as a dual volute turbocharger.

15. The device according to claim 4, wherein the oil distribution groove (10a, 11a) is formed as a moon groove.

16. The device according to claim 5, characterized in that the angular positions of the local maxima of the lubricant pressure each have an angular spacing (W1, W2) of at least 30° from a center of the feed hole (10, 11) closest in the direction of rotation.

17. The device according to claim 2, characterized in that the angular positions of the maxima (PM1, PM2) have a minimal angular spacing from one another of between 160° and 180°.

* * * * *